Sept. 27, 1960  E. P. WIGNER  2,954,335
NEUTRONIC REACTOR
Filed Feb. 4, 1946  3 Sheets-Sheet 1

Witnesses:
Herbert E. Metcalf
Walter L. Schlegel, Jr.

Inventor:
Eugene P. Wigner
By
Robert A. Zarember
Attorney

Sept. 27, 1960  E. P. WIGNER  2,954,335
NEUTRONIC REACTOR
Filed Feb. 4, 1946  3 Sheets-Sheet 3
FIG.3.
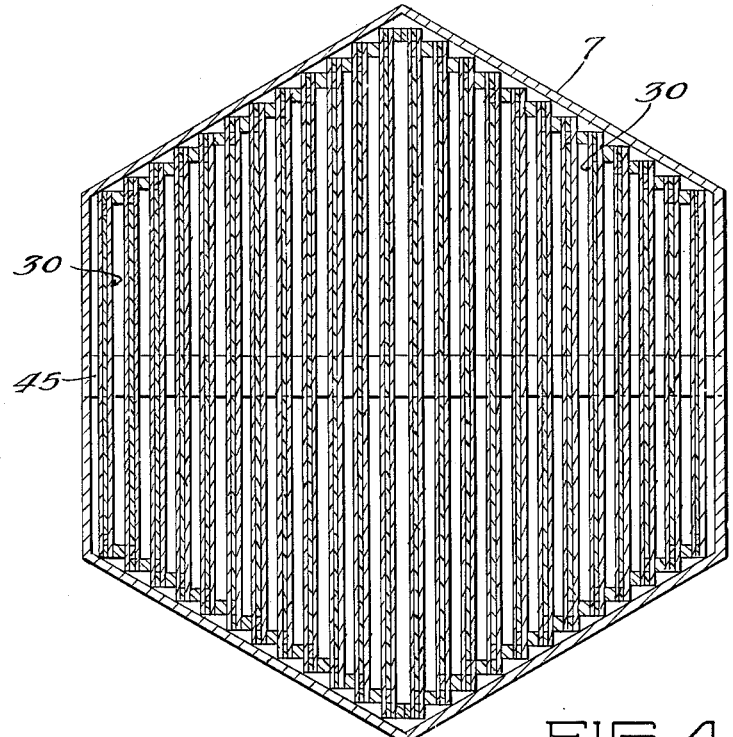
FIG.4.
FIG.5.
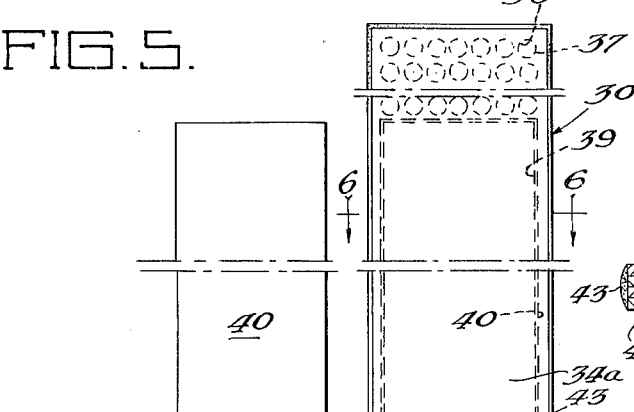
FIG.6.
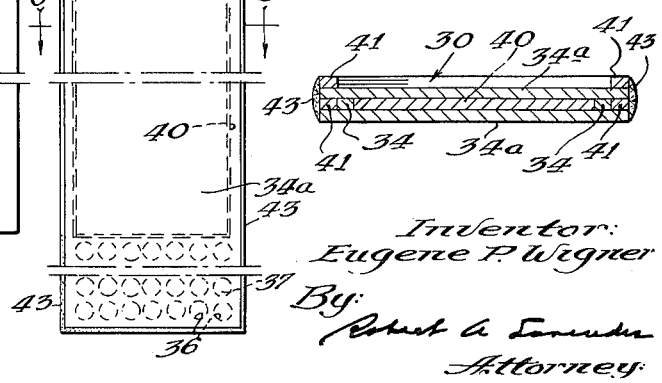
Witnesses:
Herbert E Metcalf
Walter L. Schlegel, Jr.
Inventor:
Eugene P. Wigner
By:
Robert A. ...
Attorney

United States Patent Office 2,954,335
Patented Sept. 27, 1960

2,954,335

NEUTRONIC REACTOR

Eugene P. Wigner, Princeton, N.J., assignor to the United States of America as represented by the United States Atomic Energy Commission Filed Feb. 4, 1946, Ser. No. 645,459

5 Claims. (Cl. 204—193.2)

The present invention relates to nuclear physics, and more particularly to an improved means and method of converting an isotope fissionable by thermal neutrons to another or the same thermally fissionable isotope in a neutronic reactor. The term "thermally fissionable isotope" as herein used refers, as is common, to an isotope which is fissionable by thermal neutrons.

It is known that a self-sustaining nuclear fission chain reaction can be obtained in devices known as neutronic reactors utilizing natural uranium, as a result of slow neutron fission of the $U^{235}$ content of the natural uranium. In such reactors, discrete bodies of natural uranium of high neutronic purity are disposed, usually in the form of a lattice arrangement of spheres or rods, in a neutron moderator such as graphite, beryllium or heavy water of high neutronic purity, preferably surrounded by a neutron reflector. Neutron absorption in the $U^{238}$ content of the natural uranium during the reaction leads to the production of the transuranic isotope $94^{239}$, known as plutonium (symbol Pu), which is fissionable in much the same manner as $U^{235}$. $Pu^{239}$ or $94^{239}$ is formed in neutronic reactors utilizing natural uranium in accordance with the following process:

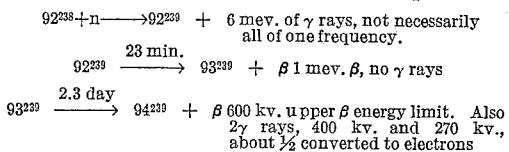

A small portion of the $94^{239}$ produced may also be changed to $94^{240}$ by absorption of neutrons. The neutronic reactors referred to above may be called "isotope converters" in that one thermally fissionable isotope is formed ($94^{239}$) as another thermally fissionable isotope ($U^{235}$) is used up. However, this conversion is not complete, and the natural uranium, which acts to supply both the reaction isotope ($U^{235}$) and the absorption isotope ($U^{238}$), will contain two different thermally fissionable isotopes after the reactor has been started. Certain presently known uranium-graphite reactors have been found to have a conversion factor of .78, $U^{235}$ to $94^{239}$. However, it may be desirable to form other fissionable isotopes in quantity such, as for example, $U^{233}$. Isotopes such as $U^{238}$ and $Th^{232}$, which are not thermally fissionable isotopes, but which, upon absorption of a neutron, produce a thermally fissionable istotope, are called "fertile isotopes."

The term "neutronic purity" as used herein has no necessary relation to chemical purity and merely refers to the absence of foreign material having the characteristic of relatively great neutron absorption. In other words, a substance may be said to have high neutronic purity, if the total amount of other material therein is incapable of absorbing a substantial number of neutrons and is thus ineffective to "poison" the nuclear fission chain reaction.

To obtain conversion of one thermally fissionable isotope to another in the most efficient manner, it is preferred to utilize a substantially neutronically pure thermally fissionable isotope, such as $94^{239}$, for the neutronic reaction, and then form the new thermally fissionable isotope $U^{233}$ separately, from a substantially pure non-fissionable isotope, such as thorium$^{232}$, which can be substantially completely converted to the new fissionable isotope $U^{233}$, fully recoverable in high purity and concentration from the thorium. Converters using the fissionable isotope in a liquid medium are disclosed and claimed in Patent No. 2,815,321, issued December 3, 1957.

An object of the present invention is to provide a means of converting an element into a fissionable isotope that can be recovered substantially completely and in high purity and concentration, by means of a neutronic reaction in which the fissionable isotope supporting the reaction is in solid form and in high concentration.

The plutonium produced by neutronic reactors using natural uranium to support the reaction is useful for many purposes, but it has one outstanding advantage over, for example, the use of $U^{235}$, as it exists in natural uranium. As plutonium is a different element from uranium it can be chemically removed from the irradiated natural uranium, and because of that fact can be obtained in substantially pure form and in high concentrations whereas $U^{235}$ can only be obtained in high concentration or substantially pure form (as far as presently known) by the much more difficult process of isotope separation. $U^{235}$ of high concentration, however, has been used to sustain a neutronic reaction.

In high concentrations of substantially pure form, plutonium can also be used, when properly combined with a neutron moderator, to sustain a slow neutron chain reaction in a neutronic reactor of relatively small size wherein the neutron leakage is high. In other words, it can be used as an efficient source of large quantities of neutrons, and the neutrons thus produced can be used to produce another fissionable isotope such as $U^{233}$.

$U^{233}$ can be formed by irradiating non-fissionable thorium ($90^{232}$) with slow neutrons according to the following process:

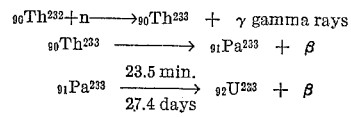

The chemical separation of $U^{233}$ from thorium is readily accomplished with high purity. The fissionable isotope $U^{233}$ will support a chain reaction, and has many desirable qualities. In particular, $U^{233}$ gives a relatively high average neutron yield per fission, the value as presently known being about 2.37–2.4 neutrons per fission (average).

While high isotope conversion factors are desirable in many instances, in other cases simplicity of construction and care of handling the materials involved can be more important. The present application is therefore primarily directed toward the provision of a simply constructed isotope converter wherein the active materials are in solid form, can be easily cooled in place, and easily removed for processing, and replaced with fresh material. It will be understood that the selection of fissionable materials, moderator materials and fertile materials, the relative amounts thereof and the critical size of the reactive composition required to produce a self-sustaining chain reaction, are not in themselves the subject of the present invention. These criteria are now familiar to persons skilled in the art. The invention is concerned with a novel construction which may be employed with any of the various combinations of materials which are already well known.

Specifically, the present invention utilizes the active fissionable isotope of plutonium, preferably in the form of a sheet of a plutonium-aluminum alloy, or a plating of plutonium on an aluminum sheet. This active aluminum sheet, together with an adjacent quantity of thorium oxide, is sealed between two protecting plates, also preferably of aluminum, to form what may conveniently be termed a sandwich. A plurality of sandwiches are assembled in a tube, preferably of hexagonal shape, and spaced in the tube to permit coolant passage therebetween. Other tubes are filled entirely with sandwichs containing $ThO_2$ only, and selected tubes are then assembled to form a reactor in which the active plates carrying the plutonium are grouped to form a reaction zone and in which the reaction zone is completely surrounded by an absorption zone containing $ThO_2$. Water, light or heavy, is then forced through the tubes between the sandwiches to cool the reaction and at least one of the tubes containing plutonium is movable to control the reaction. All of the tubes are removable for processing of their contained materials. A simple, easily assembled converter results. This type of reactor is sometimes referred to as a "sandwich-pile."

Anoher object of the invention is to provide a simple and sensitive means for controlling the neutronic reaction while at the same time producing a useful material by subjecting neutron absorbent material to intense neutron bombardment. This object is accomplished by dividing the reactor into a plurality of sections or cells, the central group of which comprises reactive composition between spaced portions of fertile material, and the outer group of cells comprises fertile material only. Thus a reactive zone is provided which is completely surrounded by an absorption zone of the particular fertile material to be bombarded. The reaction is controlled by moving at least one of the central cells relative to the others thereby at least partially removing the reactive material in said cell from the reactive zone and at the same time moving into said zone a portion of the fertile material in said cell, said material being thus moved to the central part of the reactor at which the neutron density is normally greatest.

Still another object of the invention is to provide a relatively compact sectional reactor structure, the various sections of which are independently removable to accommodate control, treatment, and replacement of the materials therein.

A further object of the invention is to design a sectional reactor structure such as above described wherein the sections or cells are polygonal in transverse cross section with the sides thereof snugly engaged with complementary sides of the adjacent cells to afford a relatively compact structure having a maximum neutron reproduction factor for the structure.

The invention comprehends a novel reactive unit in the form of a sandwich or laminated structure including a plurality of layers with fissionable and/or fertile material carried by the inner of said layers, the outer layers affording fluid-tight seal protecting said material from direct contact with a coolant fluid which is circulated through the reactor.

Reference is made to Fermi et al. Patent 2,708,656, dated May 17, 1955, for a more complete disclosure of reactors and their operations.

The foregoing and other objects and advantages of the present invention will be more fully understood by the following description read with reference to the drawings, wherein:

Fig. 3 is an enlarged transverse cross sectional view of one fuel element of the reactor shown in Fig. 1;

Fig. 4 is a side elevation of an individual sandwich;

Fig. 5 is a side elevation of the active element of the sandwich of Fig. 4; and

Fig. 6 is an enlarged cross sectional view taken as indicated by the line 6—6 in Fig. 4.

Figure 1:
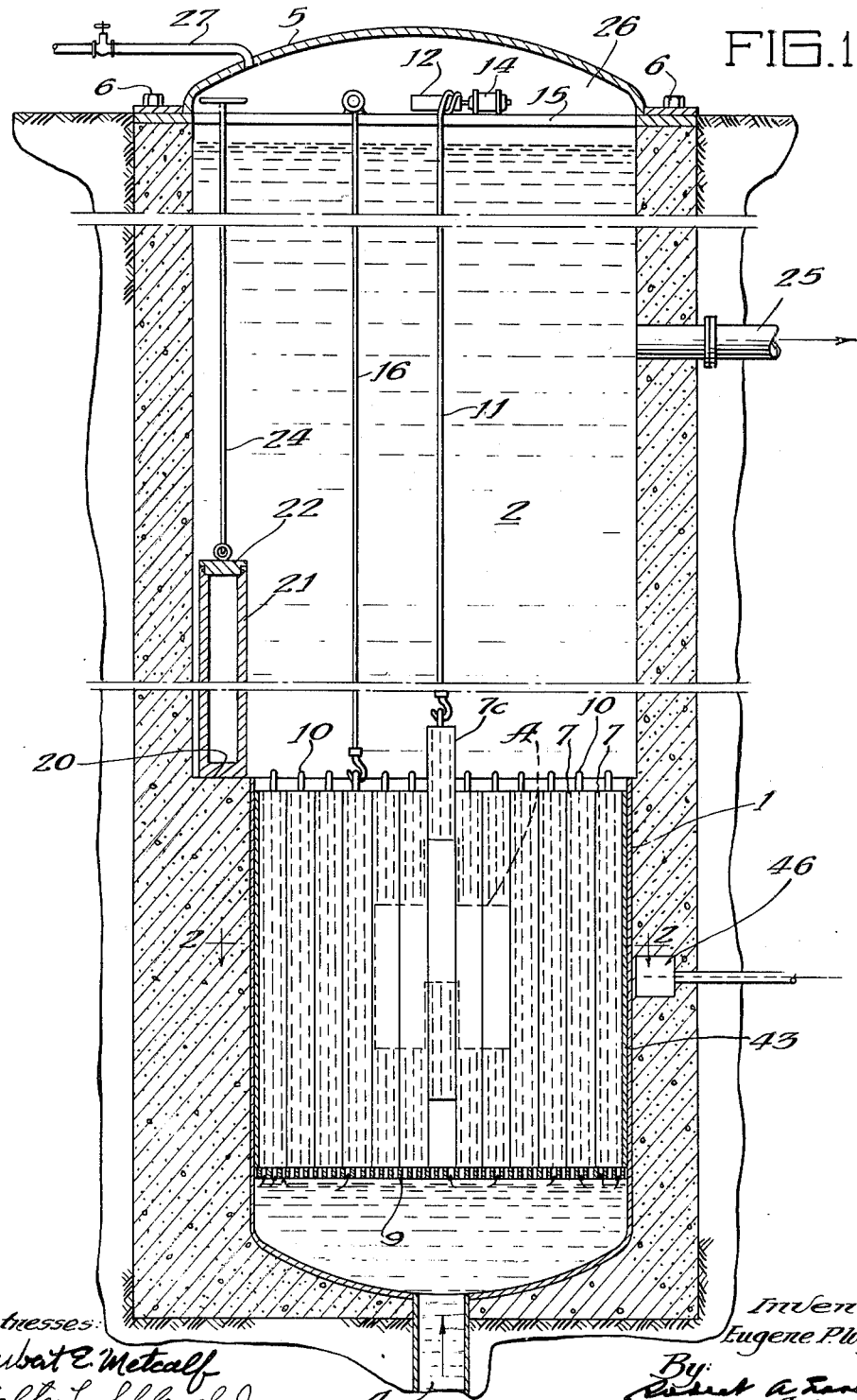
Fig. 1 is a diagrammatic vertical sectional view, partly in elevation, of a neutronic reactor embodying the present invention.
Figure 2:
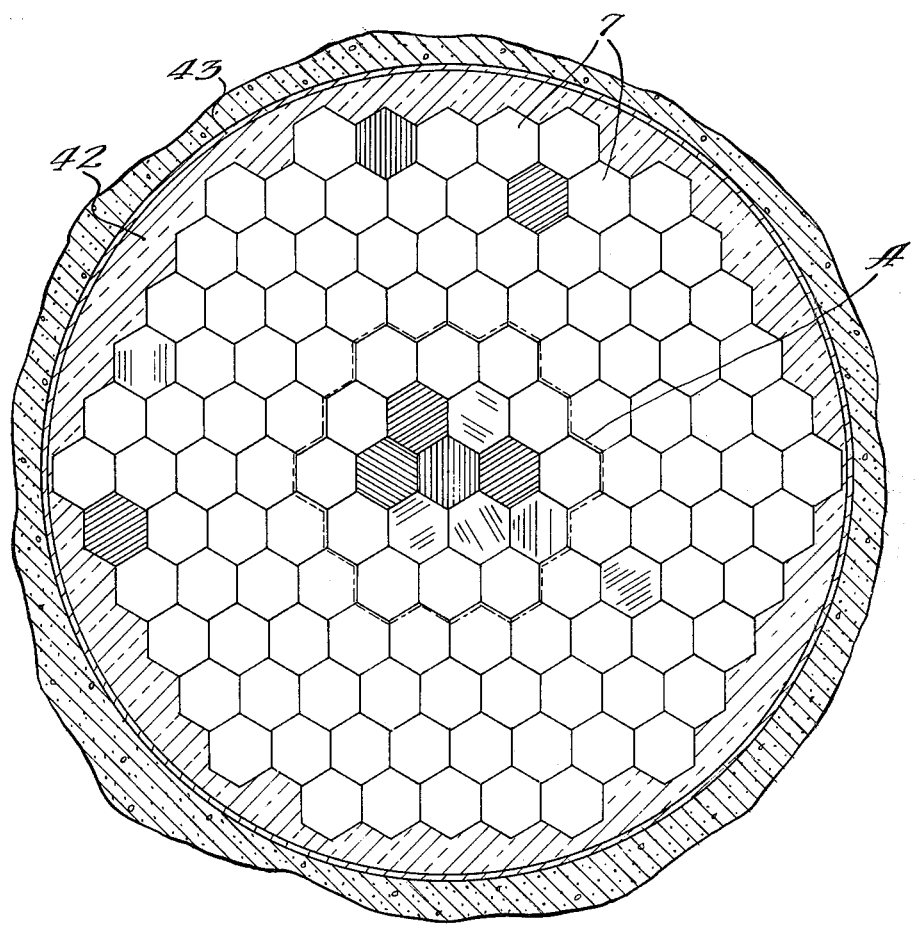
Fig. 2 is an enlarged fragmentary cross sectional view taken as indicated by line 2—2 in Fig. 1.

Referring first to Figs. 1 and 2 which show the gross structure of the device, concrete walls 1 are provided defining a pit 2 preferably positioned below ground level. Pit 2 is provided at the bottom thereof with a coolant inlet 4 and is normally closed at the top by a pressure head 5 held down by bolts 6. The cross section of the bottom portion of pit 2 is substantially circular to accommodate a plurality of adjacent loosely fitting upright hexagonal tubes 7, each resting on a perforated support 9 adjacent the bottom of the pit and each tube is provided at the top with a removal ring 10.

The central tube 7c is vertically movable by a cable 11 connected at one end to ring 10, the other end being wound on drum 12 rotatable by control motor 14. Motor 14 and drum 12 are mounted on a platform 15 extending across pit 2 just below pressure head 5. Sundry tube removal rods 16 are also provided, extending from platform 15 to engage rings 10 on other tubes as desired so that all tubes can be removed as desired.

As the tubes 7 will be radioactive after use, the pit 2 is widened just above tubes 7 to provide a shelf 20 supporting a coffin 21 of shielding material such as lead and provided with a bayonet locking cap 22 operated by coffin rod 24. The coffin 21 can be opened, a tube 7 deposited therein and the cap 22 replaced, all underneath the coolant.

A coolant exit 25 is provided adjacent the top of the pit 2. An air space 26 is maintained in the pressure head 5 and below platform 15 by air introduced through air pipe 27 attached to pressure head 5. For reactors operating at 10,000 kw. to 100,000 kw. output a coolant head of about 50 ft. provides satisfactory top shielding for radiation from the reaction. Water, light or heavy, is a satisfactory coolant, as both have desirable moderating properties as will be later discussed.

Tubes 7 are filled with vertical, parallel spaced metal sandwiches 30 as shown in Fig. 3. The sandwiches are of two types, one type being illustrated in Figs. 4 to 6 inclusive.

For the center of the reactor, sandwiches are used which contain both plutonium and $ThO_2$. For the outer portion of the reactor, the sandwiches contain only $ThO_2$.

The central portion of sandwich 30 is in each case a central aluminum plate 34. When only $ThO_2$ is to be used in the sandwich the plate 34 may be entirely perforated with holes 36 in which are placed $ThO_2$ pellets 37 of the same thickness as the plate 34 in abundance to absorb the majority of neutrons. However, certain of the sandwiches 30 contain plutonium, a central space 39 being blanked out of plate 34 in which is disposed a plutonium carrying plate 40. This plate 40 may be an alloy of 0.8 atomic percent plutonium and aluminum or an aluminum base with a plating or paint of plutonium on the exterior, or and aluminum base with holes therein containing pellets of plutonium metal or oxide. Beyond the central space 39 $ThO_2$ pellets are used in holes 36 up to the ends of the plate 34.

The central plate 34 is disposed between two aluminum cover sheets 34a which are welded around the entire perimeter to spacers 41 at 43, thereby providing a fluid-tight seal around the plate 34, or alternatively, the plate 34 may be aluminum-cladded by hot rolling with the aluminum cover sheets 34a.

The sandwiches 30 are loaded into tubes 7, with, in the particular embodiment shown, eighteen centrally disposed tubes containing the combined thorium and plutonium sandwiches and the remaining tubes containing thorium sandwiches. The sandwiches 30 are held in place by aluminum strips 45 secured respectively to the top and bottom of each tube 7, as by welding or any other convenient manner.

The tubes 7 are assembled as shown in Figs. 1 and 2, with the plutonium containing tubes 7 adjacent, and grouped to form a central reaction zone, as indicated by dotted line A (Fig. 2), and with the central plutonium carrying tube 7c movable as before described.

The tubes 7 containing only thorium sandwiches 30 are grouped around the reaction zone to form an absorption zone extending outwardly to a reflecting zone 42 (Fig. 2) formed of graphite and contoured to fit a reactor tank 43 on the outside and to fit the adjacent surfaces of the peripheral tubes 7 on the inside.

As all the sandwiches 30 are spaced within the tubes 7, the coolant water can pass freely upwardly through the entire assembly and in doing so will be in close heat exchange relationship with all parts of the reactor.

Having described the mechanical aspects of the reactor the nuclear physics of the assembly will next be discussed.

In a reactor utilizing a fissionable isotope in high concentration, the form in which the isotope is used in the moderator is relatively unimportant from a nuclear physics standpoint when the size of the reactor and the amount of the fissionable isotope is above the minimum required. A proper moderator is necessary in order that the fast neutrons of fission be slowed to energies at which new fissions can take place. In the present instance the moderator is the coolant, and either light or heavy water can be used. $D_2O$ will give the least neutron absorption, but if conversion factors are not required to be maximum, $H_2O$ is suitable, as its moderating ability is high, although its neutron absorption is also high. Choice of the type of water will therefore be predicated on the conversion factor required and on economy, as $H_2O$ is, of course, far less expensive than $D_2O$. Furthermore $H_2O$ does not have to be recirculated.

The reaction zone in the present instance, therefore, consists of plutonium protected by aluminum immersed in water, which also serves as a coolant to remove the heat of reaction.

In one embodiment of the invention the reactor is formed of 2.5 mm. sandwiches spaced 2.5 mm. in the tubes 7. The reaction zone is roughly cylindrical, with a diameter and height of 85 centimeters. The concentration of plutonium in the reaction zone is about 28 mg./cm.$^2$, and the total amount of plutonium in the reactor is about 4 kilograms. The absorption zone is about 70 cm. thick radially, and can contain up to equal parts by weight of thorium and water. With a light water ($H_2O$) flow at a velocity of 15–20 feet per minute, 20,000 kw. will be removed from the reactor during operation. Pressure head 5 permits the entire system to be operated under pressure to prevent boiling of the coolant, if desired. The conversion efficiency of the converter here described is not over 50–60 percent because of the presence of aluminum and $H_2O$ in the reaction and absorption zones, an efficiency which can be increased only a few percent by the use of heavy water as a coolant, and then only at a high cost. However, the simplicity of construction and ease of cooling make the sandwich type converter as herein described highly desirable even when maximum conversion factors are not required.

Only the coolant has to be circulated, and the same circulation cools the reaction and absorption zones. No gas is evolved from the reaction zone; and poisoning factors, due to retention of fission product neutron absorbers in the reaction zone, do not become critical because all or part of the active portion of the reactor can be replaced at daily or lesser intervals as the plutonium is used up and the poisoners produced.

The absorption zone material is also removed from the reactor and the produced $U^{233}$ extracted. $U^{233}$ itself fissions with slow neutrons, and the absorption zone sandwiches are preferably removed when the $U^{233}$ accumulates to the extent of 0.05 percent in the thorium. The thorium is then dissolved, the $U^{233}$ and fission products extracted, and the purified thorium inserted in new sandwiches for replacement in the absorption zone.

A larger scale reactor from which about 100,000 kw. can be removed is provided by using sandwiches 2.5 mm. thick spaced 2.5 mm., with a plutonium concentration of 28 mg./cm.$^2$, thereby providing in the reactor 1 molecule of fissionable Pu for each 125 molecules of water and 225 molecules of aluminum. The large scale plant has a reaction zone 2 feet wide and 8 feet long, with a 2 foot thick absorption zone. The reaction zone should be cooled with light water moving at about 30 feet per second to abstract 100,000 kw., but if desired, the flow through the absorption zone can be reduced to half that amount.

Such a reactor will contain about 30 kilograms of $94^{239}$ and will use up 150 grams per day. When the total amount of Pu has been 30 percent depleted by use, it must be removed and purified, and fresh amounts replaced to bring the reactor up to 30 kilograms again. 10 to 15 tons of thorium can be used in the absorption zone.

Several distinctive features should be noted in reactors of the type above described. The reactor as a whole is composed of relatively few removable sections, greatly facilitating removal of the materials. The removal can readily be made under water after the pressure head has been removed, the water acting as a biological shield for protection of the operating personnel.

In addition the neutronic reaction may be simply controlled by moving the center section 7c vertically in the manner above described. Thus, the neutron reproduction ratio of the reactive zone A may be regulated by withdrawing or inserting the active material of section 7c into the remaining active material, and also the $ThO_2$ within the lower portion of this section is subjected to intense neutron bombardment by being drawn into the central part of the zone A where the neutron density is greatest. The method of control described above not only affords a simple and sensitive means of regulating the reaction but also provides a highly efficient means of producing $U^{233}$ by intense neutron bombardment of the $ThO_2$ in the lower portion of section 7c. It may be noted that, if desired, a plurality of tubes 7 may be connected to suitable actuating means such as motor 14 in order to afford additional control of the reaction. The neutron density is monitored by a conventional ionization chamber 46.

Normally, the reactor will first operate with fresh plutonium, with the active material of the central tube 7c more than half out of the reaction zone. Critical conditions, i.e., where the reaction takes place with a neutron reproduction ratio of unity, can then be maintained at the desired operating power. Then, as the plutonium is used up, and the reproduction ratio drops correspondingly, the center tube 7c can be inserted further into the reactor to maintain a reproduction ratio of unity. Finally, when the center tube is exactly centered, and the reproduction ratio drops below unity the reaction stops, and one or more of the tubes containing the active material must be removed and replaced with tubes having the original amount of fissionable isotope free from fission fragments. A schedule of replacement can readily be worked out to keep the reactor operating with minimum shutdown times, in accordance with the power output and resultant use rate of the plutonium.

It should also be noted that the reaction zone is completely surrounded by the absorption zone, so that substantially all neutron leakage, fast or slow, will be intercepted by the $ThO_2$ even when the center tube is partially out of the reactor for control purposes.

The absorbing material converts by absorption of slow neutrons, so that the presence of the water in the absorption zone is useful in that the fast neutrons escaping from the reaction zone are slowed to thermal energies by the water in the absorption zone and are thus in condition to be absorbed by the thorium. The minimum thickness of the absorption zone, if the absorbing composition were to be a $ThO_2$-water slurry of equal parts by weight, is about 38 centimeters to slow all but 1 percent of the escaping fast neutrons to thermal energy. The plate construction used in the present device aggregates the thorium in the water and thus for minimum final escape the absorption zone should be from 50–85 centimeters thick. As some fissions in the $U^{233}$ formed in the absorption zone are bound to take place near the periphery of the absorption zone some of the neutrons produced may escape outwardly. The carbon reflector is used to return as many as possible of such neutrons to the absorption zone.

While the chemical procedures involved in the purification of the plutonium or in the recovery of the $U^{233}$ from the thorium are no part of the present invention, such separations are readily made by liquid-solvent extraction methods, among others, after the sandwiches have been dissolved.

From the above discussion it can be seen that the use of the fissionable isotope in solid form as disclosed and claimed herein has many advantages over the use of the fissionable isotope in a liquid medium such as a solution, for example, even though conversion values are lower. Dissociation of the water and production of gases in the coolant is negligible. The active isotope does not have to be circulated outside of the reactor for cooling, thereby greatly simplifying shielding of the system and completely preventing delayed neutrons being emitted outside of the reaction zone. The reaction zone can be completely surrounded by the absorption zone, and the reactor can be made in easily removable sections.

While the theory of nuclear reaction set forth herein is based on the best presently known experimental evidence, the invention is not limited thereto, as additional experimental data later discovered may modify the theory disclosed.

Obviously, many modifications may be made in the specific embodiments disclosed without departing from the intended scope of the invention.

What is claimed is:

1. In an isotope converter having means for sustaining a nuclear fission chain reaction the improved structure comprising a plurality of plate-like sandwiches, water therebetween, each of the central group of said sandwiches comprising a neutron permeable plate with a central opening and a plurality of other openings at opposite ends thereof, material containing plutonium in the central opening, fertile material in the other openings, and neutron permeable plates joined to opposite sides of the first-mentioned plate and sealing said openings, the outer group of said sandwiches each comprising a neutron permeable plate with a plurality of openings, fertile material in said openings, and neutron permeable plates sealing said last-mentioned openings, whereby the material containing plutonium within said central openings defines a reactive zone entirely surrounded by an absorption zone of said fertile material.

2. In an isotope converter, a plurality of members each comprising longitudinally spaced portions of neutron absorbent material containing $Th^{232}$ and an intermediate portion of material containing plutonium, a zone of absorption material containing $Th^{232}$ around said members, water in moderating and heat exchange relation with said members, and means for passing said water, through said members, said intermediate portions defining a reactive zone having a neutron reproduction ratio greater than unity.

3. In an isotope converter, a plurality of hollow members each containing longitudinally spaced portions of neutron absorbent material containing $Th^{232}$ and an intermediate portion of material containing plutonium, a zone of absorption material containing $Th^{232}$ around said members, a neutron moderator and water in moderating and heat exchange relation with said members, said intermediate portions defining a reactive zone having a neutron reproduction ratio greater than unity, and means for regulating the neutron reproduction ratio of said reactive zone comprising means for moving at least one of said members longitudinally thereof.

4. In combination with a neutronic reactor having a chain-reactive composition containing plutonium, the improved control device comprising, in combination, an elongated body having a material containing plutonium in one longitudinal portion thereof and having fertile material and no material containing plutonium in an adjoining longitudinal portion thereof, said body extending through said reactive composition, and a drive mechanism coupled to said body for adjusting the longitudinal position thereof to vary the neutron reproduction factor of the reactive composition.

5. A structural assembly for a neutronic reactor comprising a tube and a plurality of sandwiches positioned in the tube in spaced and generally parallel relation to one another and to the axis of the tube, each sandwich having its opposed side edges in engagement with spaced regions of the tube, each sandwich comprising a middle neutron-permeable plate having a central opening and a plurality of other openings at opposite ends of the plate, material containing plutonium in the central opening, fertile material in said other openings, and outer neutron-permeable plates joined to opposite sides of the middle plate and sealing the openings therein.

References Cited in the file of this patent

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |
| 233,278 | Switzerland | Oct. 16, 1944 |

OTHER REFERENCES

Fermi et al.: "Artificial Radioactivity Produced by Neutron Bombardment," Proc. Royal Soc. (London), Series A, No. 868, vol. 149, pages 554–557, April 1935.

Smyth: "Atomic Energy for Military Purposes," August 1945. (Copy may be purchased from Supt. of Documents, Washington 25, D.C.)

"How Atom Splitting Releases Energy," Business Week, pages 57–64, Sept. 1, 1945.

Kelly et al.: Physical Review, 73, 1135–9 (1948).